(12) United States Patent
Le Grand et al.

(10) Patent No.: US 12,270,753 B2
(45) Date of Patent: Apr. 8, 2025

(54) DEVICE FOR POLARIMETRICALLY CHARACTERISING THE ANISOTROPY OF A MEDIUM, AND CORRESPONDING IMAGING SYSTEM

(71) Applicant: UNIVERSITE DE BRETAGNE OCCIDENTALE, Brest (FR)

(72) Inventors: Yann Le Grand, Brest (FR); Sylvain Rivet, Plouarzel (FR); Matthieu Dubreuil, Plougonvelin (FR); Xavier Theillier, Brest (FR)

(73) Assignee: UNIVERSITE DE BRETAGNE OCCIDENTALE, Brest (FR)

( * ) Notice: Subject to any disclaimer, the term of this patent is extended or adjusted under 35 U.S.C. 154(b) by 186 days.

(21) Appl. No.: 18/005,740

(22) PCT Filed: Jul. 16, 2021

(86) PCT No.: PCT/EP2021/070053
§ 371 (c)(1),
(2) Date: Jan. 17, 2023

(87) PCT Pub. No.: WO2022/013448
PCT Pub. Date: Jan. 20, 2022

(65) Prior Publication Data
US 2023/0273116 A1    Aug. 31, 2023

(30) Foreign Application Priority Data

Jul. 17, 2020    (FR) ...................................... 2007550

(51) Int. Cl.
*G01N 21/21*    (2006.01)
*G01N 21/359*    (2014.01)

(52) U.S. Cl.
CPC ........... *G01N 21/21* (2013.01); *G01N 21/359* (2013.01)

(58) Field of Classification Search
CPC .......................... G01N 21/21; G01N 21/359
See application file for complete search history.

(56) References Cited

U.S. PATENT DOCUMENTS

| 5,737,076 A * | 4/1998 | Glaus ...................... G01J 3/457 356/310 |
| 7,202,950 B2 | 4/2007 | Shribak et al. |
| 2009/0087191 A1* | 4/2009 | Leard ....................... G01J 3/51 398/152 |

FOREIGN PATENT DOCUMENTS

WO    WO-2017099755 A1 *    6/2017

OTHER PUBLICATIONS

International Search Report dated Sep. 10, 2021 for corresponding International Application No. PCT/EP2021/070053, filed Jul. 16, 2021.

(Continued)

*Primary Examiner* — Hina F Ayub
(74) *Attorney, Agent, or Firm* — David D. Brush; Westman, Champlin & Koehler, P.A.

(57) ABSTRACT

A device is provided for polarimetrically characterising anisotropy of a medium. The device includes a light source, spectral polarisation coding and decoding elements, and a light detector. The coding element includes a spectral modulator composed of at least one chromatic phase delay plate shaped as a function of a saturation threshold of the light detector.

12 Claims, 3 Drawing Sheets

(56) References Cited

OTHER PUBLICATIONS

Written Opinion of the International Searching Authority dated Sep. 10, 2021 for corresponding International Application No. PCT/EP2021/070053, filed Jul. 16, 2021.

French Search Report and Written Opinion dated Feb. 23, 2021 for corresponding French Application No. 2007550, filed Jul. 17, 2020.

Le Gratiet A et al, "100 kHz Mueller polarimeter for laser scanning polarimetric microscopy", Proceedings of SPIE; [Proceedings of SPIE ISSN 0277-786X vol. 10524], SPIE, US, vol. 9887, Apr. 27, 2016 (Apr. 27, 2016), p. 988724-988724, XP060069261.

Lemaillet P et al, "Optimization of a snapshot Mueller matrix polarimeter", Optics Letters, Optical Society of America, US, vol. 33, No. 2, Jan. 15, 2008 (Jan. 15, 2008), p. 144-146, XP001511132.

* cited by examiner

DEVICE FOR POLARIMETRICALLY CHARACTERISING THE ANISOTROPY OF A MEDIUM, AND CORRESPONDING IMAGING SYSTEM

CROSS-REFERENCE TO RELATED APPLICATIONS

This Application is a Section 371 National Stage Application of International Application No. PCT/EP2021/070053, filed Jul. 16, 2021, which is incorporated by reference in its entirety and published as WO 2022/013448 A1 on Jan. 20, 2022, not in English.

TECHNICAL FIELD

The invention is in the field of polarimetry.

More particularly, the invention relates to a new concept of spectral coding polarimetric characterisation device, enabling the characterisation of the anisotropy of a given medium.

The invention applies especially, but not exclusively, to the microscopic imaging of biological samples, to the measurement of natural phase and amplitude anisotropies (such as the measurement of rotatory power, birefringence and/or dichroism, for example) or induced by an electric and/or magnetic field, or induced by mechanical stresses, as well as to the measurement of electric and/or magnetic fields or mechanical stresses.

The invention is particularly well adapted to the measurement of anisotropies of very small amplitudes: typically less than $10^{-4}$ degrees for a phase anisotropy and $10^{-6}$ for an amplitude anisotropy in the case of a measurement whose duration is 10 µs, and up to $10^{-6}$ degrees for a phase anisotropy and $10^{-8}$ for an amplitude anisotropy in the case of a measurement whose duration is 100 ms.

PRIOR ART

A polarimeter is a device used to non-destructively characterise the polarisation state of light passing through a medium, or, depending on the optical configuration used, the polarisation state of light reflected, refracted or diffracted by that medium.

From a theoretical point of view, light is an electromagnetic wave whose electric field oscillates in a plane perpendicular to its direction of propagation. Several parameters can characterise an electromagnetic wave, in particular intensity, frequency, phase and polarisation. Polarisation is based on the vector aspect of the electromagnetic wave. This parameter has been used for decades to measure optical anisotropy properties of various media, such as birefringence (which is phase anisotropy) or dichroism (which is amplitude anisotropy) for example. Polarimetric imaging, among other things, can reveal additional contrasts compared to so-called conventional imaging (based on the principle of light absorption), offering new information on the properties of the media being characterised.

There are several polarimetric approaches to characterise the anisotropic properties of a medium, based on polarisation coding (or modulation): time coding (based on sequential separation of polarisation states), spatial coding (based on spatial separation of polarisation states), and spectral coding (based on wavelength separation of polarisation states).

A time coding-based device generally requires the use of coding or respectively decoding elements, active to modulate or respectively demodulate the polarisation of light. An optical element is called active when its function is activated or controlled by an external mechanical or electrical stimulus. Conventional examples are mechanically adjustable phase plates, Pockels cells, photo-elastic cells or electro-optical cells. The use of such active elements generally leads to problems of speed of acquisition (the acquisition of measurements depending on the reactivity of the active elements). A spatial coding-based device is a very fast but cumbersome measurement system because it requires the spatial parallelization of coding and decoding, using several analysis channels, thus several detectors.

A spectral coding-based device, on the other hand, is a fast and compact system that uses passive optical elements such as stationary, non-electrically controlled phase plates. Traditionally, a spectral coding device includes, in its input arm, a multi-wavelength light source followed by a polarisation state generator and, in its output arm, a polarisation state analyser followed by a light detector. The medium to be characterised is arranged between the input and output arms. The polarisation state generator comprises a first polariser and spectral polarisation coding means (typically birefringent crystals). The polarisation state analyser comprises spectral polarisation decoding means optically coupled to a second polariser. The principle is to spectrally polarisation code the incident light to make it interact with the medium and to spectrally polarisation decode the light coming from the medium, after interaction with it, so as to detect the polarisation state modified by the medium. The anisotropic characteristics of the medium can then be determined as a function of the light signal received by the light detector. Thus, by spectrally parallelizing the coding and decoding and using only passive optical elements, the polarimetric measurement of a spectral coding device is very fast in contrast to time coding/decoding. In addition, such a device is compact because it uses a single detector and the coding and decoding elements are phase plates a few millimetres thick.

These time, spatial or spectral coding-based devices are used to make a point measurement and can be integrated into an imaging system to map the polarimetric properties of a medium.

The polarimetric characterisation devices described previously are capable of measuring the polarimetric response of a study medium by discriminating between different polarimetric properties. However, such devices do not provide as sensitive an anisotropy measurement as devices based on a "darkfield" configuration. An optical device is called "darkfield" when it is configured such that the intensity of light detected by the light detector tends to a zero value when the anisotropy of the medium is zero (for example by arranging a pair of crossed polarisers). However, "darkfield" configurations are sensitive to the square of the polarimetric phenomenon, which limits the performance of these devices.

In order to improve the sensitivity of polarisation measurements, polarimetric configurations tending towards darkfield characterisation have been provided (called "near darkfield"), such as those described in U.S. Pat. No. 7,202, 950B2 (based on time coding) and patent document WO2017099755 (based on spectral coding). Such configurations are based on linear detection of the light intensity received by the light detector. This linear detection is achieved by implementing a polarimetric bias implemented in a darkfield configuration (for example with a pair of slightly uncrossed polarisers or by adding an anisotropy of the same nature as the anisotropy to be measured). Whether based on spectral or time coding, this approach increases the sensitivity of the measurements. However, in this type of configuration, the measurement resolution is highly dependent on the stability of the light source during the measurements, which is not optimal. In order to overcome this restriction, a known and developed solution for the measurement of circular phase anisotropy consists in performing additional polarisation coding, for example by time modulating the polarimetric bias through one or more active optical components. However, such components are limited in terms of coding speed (typically 100 Hz), and are of non-negligible size, which can pose problems in terms of overall size, especially when the device is intended to be integrated into an imaging system. Such limitations do not allow the anisotropy of a medium to be characterised in an ultra-sensitive manner and with a high speed of execution.

There is therefore a real need to provide a polarimetric characterisation technique with increased sensitivity, which is particularly well adapted to low amplitude anisotropy media, and which is efficient in terms of speed of execution.

SUMMARY OF THE INVENTION

In a particular embodiment of the invention, there is provided a device for polarimetrically characterising the anisotropy of a medium, comprising:
- a light source emitting multi-wavelength light,
- spectral polarisation coding means arranged between the light source and the medium, configured to spectrally polarisation code the emitted light, said coding means comprising a first polariser defining a first polarisation axis, called reference axis,
- a light detector defining a predetermined intensity saturation threshold,
- spectral polarisation decoding means arranged between the medium and the light detector and configured to spectrally polarisation decode light returned by the medium, said decoding means comprising a second polariser defining a second polarisation axis oriented perpendicular to the reference axis, the coding means of such a device comprising a spectral modulator arranged as an output of the first polariser, said modulator comprising a first chromatic phase delay plate characterised by a first neutral axis, said first phase delay plate being shaped so that the first neutral axis defines, with the reference axis, a tilt angle whose value is a function of the saturation threshold of the light detector in order to obtain an increased sensitivity of said device.

Thus, the present invention provides an approach consisting in using passive polarisation coding and decoding means to provide an increased sensitivity characterisation of the anisotropy of the medium. By introducing a phase delay in a totally passive manner and which is a function of the saturation threshold of the light detector, it is thus possible to achieve a linear detection of the anisotropy of the medium by a measurement of the light intensity received on the light detector, which allows a more sensitive and faster characterisation of the medium to be characterised.

According to a particular aspect of the invention, the spectral modulator comprises a second chromatic phase delay plate arranged as an output of said first phase delay plate, said first and second delay plates being shaped so as to produce respectively different first and second phase delays.

The presence of a set of two phase delay plates allows spectral coding to be performed on the basis of two carriers of distinct modulation frequencies, one allocated to the measurement of anisotropy of the medium M and the other allocated to the light source. Thus, the light intensity detected by the light detector carries information relating to the anisotropy of the medium M and information relating to the light source.

According to a particular aspect of the invention, said first and second phase delay plates consist of a same birefringent crystalline material and have a different thickness.

This approach is simple to implement and inexpensive.

Alternatively, said first and second phase delay plates consist of a crystalline material of different birefringence.

According to another particular aspect of the invention, the second phase delay plate has a second neutral axis oriented so as to be the same as the reference axis.

According to a particular characteristic, the light source has a predetermined spectral bandwidth, the first and second phase delay plates each have a thickness which depends on said predetermined spectral bandwidth.

This ensures that the different parameters of the studied anisotropy of the medium are allocated to different carriers, so that the device can perform an independent measurement of the different parameters of this anisotropy. According to another particular aspect of the invention, wherein, the medium having an anisotropy of a predefined type:
- the coding means comprise a passive phase adapter arranged as an output of the optical amplifier and shaped so as to induce a third phase delay which is a function of said predefined type of anisotropy; and
- the decoding means comprises a passive phase compensator arranged as an input of the second polariser and shaped to apply a fourth phase delay which is a reverse phase delay to the third phase delay.

Thus, the invention provides for the possibility of measuring anisotropy of different natures (linear, circular, elliptical for example) by simply playing on the phase delay of the device upstream and downstream of the medium.

According to a first particular implementation of the invention, the type of anisotropy is circular:
- the phase adapter consists only of a first achromatic waveplate or is free of an optical plate;
- the phase compensator consists only of a second achromatic waveplate or is free of an optical plate.

Thus, the device can be configured to perform a measurement of circular type anisotropy.

According to a second particular implementation of the invention, said type of anisotropy is linear:
- the phase adapter consists only of a first achromatic quarter-wave plate, having a neutral axis oriented at an angle substantially equal to 45 degrees with respect to the reference axis;
- the phase compensator consists only of a second achromatic quarter-wave plate, having a neutral axis oriented at an angle substantially equal to −45 degrees with respect to the reference axis.

Thus, the device can be configured to perform a measurement of linear type anisotropy.

According to a third particular implementation of the invention, said type of anisotropy is elliptical:
- the phase adapter consists only of:
  - a third chromatic phase delay plate having a third neutral axis oriented at an angle substantially equal to 45 degrees with respect to the reference axis,
  - a first achromatic quarter-wave plate, having a first neutral axis oriented at an angle substantially equal to 0 degree with respect to the reference axis, and arranged as an output of said third plate;
- the phase compensator consists only of:

a second achromatic quarter-wave plate, having a second neutral axis oriented at an angle substantially equal to 90 degrees with respect to the reference axis; and a fourth chromatic phase delay plate having a fourth neutral axis oriented at an angle substantially equal to −45 degrees with respect to the reference axis, and arranged as an output of said second plate.

Thus, the device can be configured to perform a measurement of elliptical type anisotropy.

According to a first implementation of the device, the phase adapter and the phase compensator form two distinct blocks arranged on either side of the medium so as to form a transmission polarimetric configuration.

According to a second implementation of the device, the phase adapter and phase compensator form a single-block element arranged between a beam splitter cube and an optically reflective element, said reflective element being arranged to reflect light returned by the medium to the light detector via the beam splitter cube, so as to form a reflection polarimetric configuration, said single-block element playing the role of a phase adapter for incident light coming from the beam splitter and the role of a compensator for incident light corresponding to the light reflected by the reflective element.

The availability of different configurations may facilitate the integration of the device into a system comprising other elements, such as an imaging system for example.

In another particular embodiment of the invention, an imaging system is provided comprising:

a polarimetric characterisation device in any of its various embodiments, said device comprising means for obtaining polarimetric characterisation measurement data of the medium;

means for generating a polarimetric image of the medium taking account of said polarimetric characterisation measurement data.

FIGURES

Further characteristics and advantages of the invention will become clearer upon reading the following description, given as an illustrative and non-limiting example, and the attached drawings, among which.

DETAILED DESCRIPTION OF THE INVENTION

In the figures herein, identical elements are designated by a same numerical reference.

The general principle of the invention is based on the use of passive polarisation coding and decoding means to enable polarimetric characterisation with increased sensitivity. The invention provides to apply, in a totally passive way, a phase delay which is a function of the saturation threshold of the light detector, to allow a linear detection of the light intensity by the light detector, so that the polarimetric characterisation is more sensitive and faster than in the state of the art.

Figure 1:
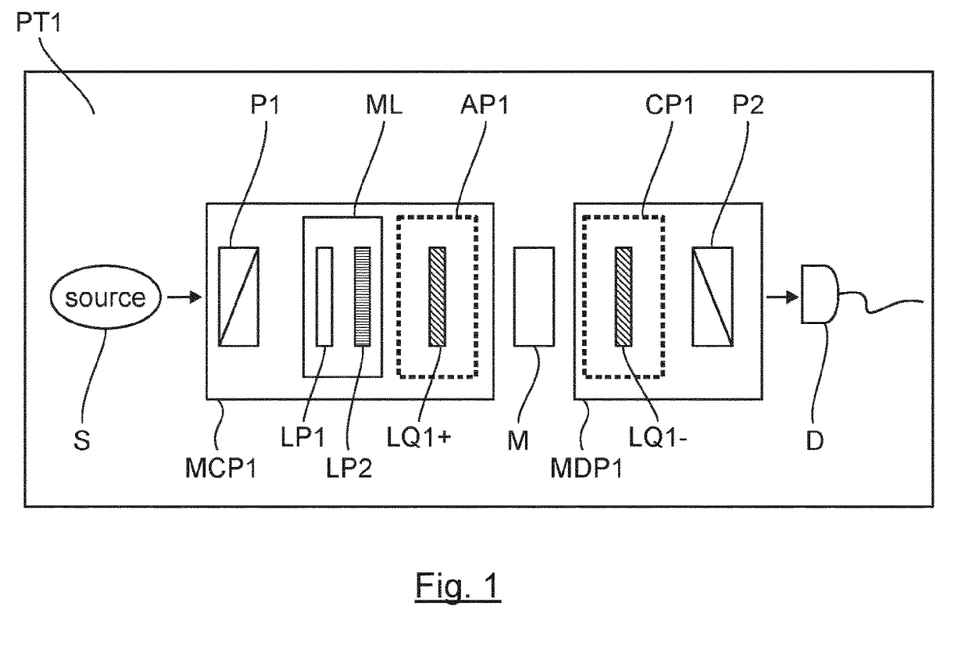
FIG. 1 sets forth a first transmission configuration of a characterisation device according to a particular embodiment of the invention.

Two particular configurations of the device according to the invention are provided: a transmission configuration described in connection with FIGS. 1 to 3 and a reflection configuration described in connection with FIGS. 4 and 5.

In a simplified manner, a first transmission configuration of a polarimetric characterisation device PT1 according to the invention is set forth in connection with FIG. 1. This particular configuration allows an ultra-sensitive measurement of the circular type anisotropy of a medium M, whether it is a circular phase anisotropy (for example to measure the rotation angle of the rotatory power of the medium) or a circular amplitude anisotropy (for example to measure the circular diattenuation of the medium).

The medium M is characterised by an isotropic transmittance T which corresponds to the ratio of the light intensity of the light coming from the medium (after interaction with it), denoted as I, to the light intensity directly coming from the light source S (without interaction with the medium), denoted as $I_0$. In this case, the light intensity I can be written mathematically as follows: $I = T \times I_0$.

The medium M is for example a sucrose-based solution, characterised by a rotatory power (circular phase anisotropy) and whose rotation angle θ is desired to be measured. Once the rotation angle θ has been measured, it is possible to deduce the sugar concentration contained in this solution.

According to the invention, the polarimetric device comprises:

in its input arm, a light source S arranged as an input of a spectral polarisation coding block, referenced MCP1;

in its output arm, a spectral polarisation decoding block MDP1, arranged as an input of a light detector D; and the medium M, which is arranged between the coding MCP1 and decoding MDP1 blocks.

The coding block MCP1 is configured to spectrally polarisation code the light emitted by the source S. Therefore, each emitted wavelength is assigned a distinct polarisation state characterising the light interacting with the medium M. As for the decoding block MDP1, it is configured to spectrally polarisation decode the light returned by the medium M. The light signal received by the detector D is a wavelength-modulated signal whose modulation amplitude is associated with the anisotropy of the medium M or with the characteristics of the source S, depending on the modulation frequency considered.

As illustrated in the figure, the above-mentioned elements S, MCP1, M, MDP1 and D are arranged and centred on a same axis of the device (not represented) so as to form a transmission configuration: the light emitted by the source S passes through (via the block MCP1) the medium M and emerges after interaction with the medium M in the direction of the detector D (via the block MDP1).

The light source S is a spectral broadband source emitting unpolarised multi-wavelength light, with an amplitude $I_0$. In the present example, the light source is a wavelength scan laser source emitting in the near infrared range, typically between 1000 and 1100 nm with a scan speed of 100 kHz (to allow a relatively stable measurement of the anisotropy of the medium M over a duration of 10 μs).

The light detector D is an avalanche photodiode, sensitive to the spectral range between 600 and 1150 nm. The detector D is configured to detect the light intensity it receives as an output of the decoding block MDP1 and converts it into an electrical signal for a processing unit (not represented) which allows the electrical signal to be resampled in time intervals equivalent to optical frequency intervals. The latter is electrically connected to the light source S on the one hand, and to the light detector D on the other hand, for the purpose of driving these two elements. Furthermore, the detector D is characterised by a light intensity saturation threshold $S_D$, defined as the amount of light above which the photosensitive layer of the detector is no longer able to detect a variation in light intensity.

Input Arm of the Device

The coding block MCP1 comprises an achromatic linear polariser P1 defining a polarisation axis. This polarisation axis constitutes, in an arbitrary way, the reference axis of the device according to the invention. The polariser P1 converts the unpolarised multi-wavelength light emitted by the source S into linearly polarised light whose orientation is parallel to that of the reference axis. By "achromatic", it is meant that the polariser converts the incident light independently of the wavelengths characterising that light.

The coding block MCP1 also comprises a lineariser modulator ML, arranged as an output of the polariser P1. The lineariser modulator ML, more generally called spectral modulator, is a passive optical component comprising a set of two phase delay plates successively arranged and centred on the axis of the device. These two plates are referenced LP1 and LP2 in FIG. 1 (and the other figures as well, given that this is an optical block common to all the optical configurations provided within the context of the present invention). These two plates are chromatic and passive. By "chromatic", it is meant, for a given plate, that this plate produces a phase delay on the incident light which depends on the wavelength considered. Thus, a different phase delay is induced by the plate for each wavelength emitted by the source S.

Figure 6:
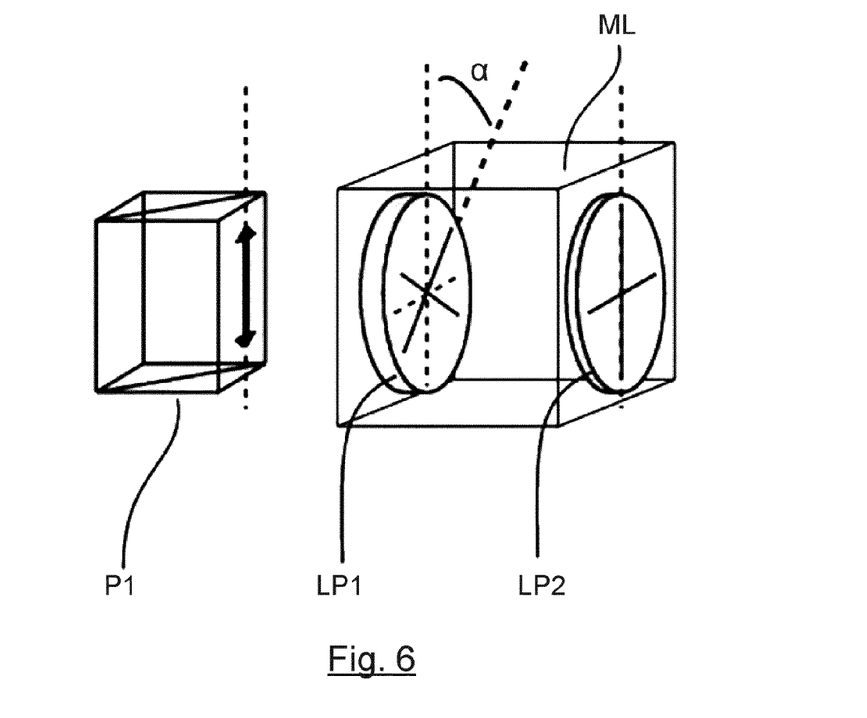
FIG. 6 schematically illustrates the structure of a passive lineariser modulator according to a particular embodiment of the invention.

More precisely, as illustrated in FIG. 6, the lineariser modulator ML comprises a first phase delay plate LP1 defining a first neutral axis such that this first neutral axis forms, with the reference axis, a predetermined tilt angle α (hereinafter also referred to as the linearisation factor α). The tilt angle α is defined in the plane perpendicular to the main axis of the device (axis of propagation of the light), between the neutral axis of the phase delay plate LP1 and the reference axis. The value of the linearisation factor α (expressed in degrees) is in the range [0; 90], and is a function of the intensity level of the light $I_0$ emitted by the source S and the saturation threshold $S_D$ of the light detector D. In the particular configuration of a measurement of the circular anisotropy of the medium M, the value of the linearisation factor α is 0.46 degrees, in order to be close to the saturation threshold of detector D. The lineariser modulator ML further comprises a second phase delay plate LP2 defining a second neutral axis such that this second neutral axis is parallel to the reference axis.

Generally speaking, the plates LP1 and LP2 are each shaped so as to produce a different phase delay on the incident light. To do so, in the particular example set forth here, the phase delay plates LP1 and LP2 each consist of a birefringent crystal of yttrium vanadate (YVO4) and each have a different thickness such that the phase delay applied by the plate LP1 is different from that applied by the plate LP2. The plate LP1 has a thickness e1 equal to 2.0 mm, and the plate LP2 has a thickness e2 equal to 0.4 mm, the thickness values chosen for each of these two plates being a function of the spectral bandwidth of the source S and the number of time intervals implemented by the detector D (to resample the electrical signal). Except in terms of thickness, the plates LP1 and LP2 are identical, only the plate LP1 is tilted at the angle α with respect to the reference axis of the device.

Alternatively, it could be envisaged that the phase delay plates LP1 and LP2 are each made of a material of different birefringence, so that the phase delay applied by the plate LP1 is different from that applied by the plate LP2 (it being understood that the thickness of the plate LP1 may be identical or different from the thickness of the plate LP2).

For example, the plates LP1 and LP2 may each consist of a crystalline material based on quartz ($SiO_2$), calcite ($CaCO_3$), yttrium vanadate (YVO4), or tellurium dioxide ($TeO_2$), without being exhaustive.

The presence of the two phase delay plates makes it possible to perform spectral polarisation coding on the basis of two carriers of distinct frequencies: a first carrier of frequency f0 allocated to the measurement of anisotropy of the medium M (introduced by the plate LP1) and a second carrier of frequency f1 allocated to the light source (introduced by the plate LP2). By "carrier", it is meant a sinusoidal function defined at a fixed frequency and changing as a function of wavelengths. If the light source used is a wavelength scan laser source for example, then the carrier is a sinusoidal function changing as function of time. In other words, the polarised light coming from the polariser P1 is spectrally polarisation encoded by means of two distinct carriers, the amplitude of one of which is proportional to the circular anisotropy of the medium M to be characterised.

The lineariser modulator ML thus converts, without active elements, the linearly polarised light coming from the polariser P1 into spectrally polarisation coded light adapted to perform both a modulation of the light intensity in wavelength and a linearisation of the detection of the anisotropy of the medium M, and thus to allow a measurement of this anisotropy with an increased sensitivity. This spectral coding depends on the linearisation factor α, which itself depends on the saturation threshold $S_D$ of the detector D. The modulation frequencies f0 and f1 are chosen so as to reduce to a minimum the noise introduced by the detector D and associated with the intensity fluctuations of the source S.

It is reminded here that the spectrally polarisation coded light is a light carrying a plurality of polarisation states, each associated with a given wavelength of the spectral band. Within the context of the present invention, the polarisation coding applied by the lineariser modulator ML is specifically adapted to maximise the signal-to-noise ratio of the light intensity measurement of the anisotropic phenomenon at the detector D.

The first plate LP1 is therefore used to modulate the incident light by the carrier of frequency f0. The resulting photoelectric current delivered by the detector D then corresponds to the mathematical sum of two contributions: a continuous signal and a modulation of frequency f0 which depend linearly on the anisotropy of the medium M and on the light intensity returned by the medium M, hereinafter denoted as intensity $I_M$. The frequency f0 of the carrier depends on the phase shift of the plate LP1 (that is, its thickness and birefringence). The second plate LP2 is therefore used to modulate the incident light by a second carrier of frequency (f1) different from the first carrier. The resulting photoelectric current delivered by the detector D is the sum of several contributions, namely: a modulation at frequency f0 whose amplitude is equal to the mathematical product $I_M \times \alpha^2$ (for a linearisation factor $\alpha$ of less than 10 degrees), a modulation at the second frequency f1 whose amplitude is equal to the mathematical product $I_M \times \alpha \times \theta$, where $\theta$ is the rotation angle of the rotatory power of the medium M. The frequency f1 depends on the cumulative phase delays of the plates LP1 and LP2. For example, for two plates LP1 and LP2 made of the same material, respectively of thickness e1 and e2, then the frequency f1 can be expressed mathematically as follows: $f1=(1+e2/e1)\times f0$.

For example, for a wavelength scan of the laser source over 100 nm in 10 μs and plates LP1 and LP2 made of YVO4 with thicknesses of 2.0 mm and 0.4 mm respectively, the frequency f0 is equal to 1.8 MHz and f1 to 2.16 MHz.

Thus, the first modulation is insensitive to the medium M with respect to the anisotropy of the medium M, whereas the second modulation is proportional to the circular phase anisotropy associated with the medium M. Based on this observation, the inventors found that the presence of the plate LP1 allows the anisotropy of the medium to be detected linearly, whereas that of the plate LP2 allows the light intensity $I_M$ to be differentiated from the anisotropy by the addition of a carrier at a different frequency. The ratio of the amplitude of the first carrier (of frequency f0) to the amplitude of the second carrier (of frequency f1) allows the anisotropy of the medium M to be measured independently of the light intensity $I_M$. This has the advantage of overcoming light intensity losses related to the light intensity of the source S and the transmission of the medium M.

Alternatively or additionally, if the light intensity level of the light source $I_0$ is known beforehand, and based on the principle that the medium M neither absorbs nor scatters the light or that the transmittance of the medium M is known and stable during the time window of the measurement, it is possible to dispense with the plate LP2.

The coding block MCP1 also includes a phase adapter AP1 arranged, on the one hand, as an output of the linear modulator ML and, on the other hand, as an input of the medium M. Generally speaking, the function of the phase adapter is to adapt the polarisation state of the light coming from the linear modulator ML, by inducing a phase delay which is a function of the type of anisotropy to be characterised.

Since the circular phase anisotropy is described by a single parameter, which is the rotation angle $\theta$, the amplitude of each of the two carriers at f0 and f1 is sufficient for the measurement of the parameter $\theta$ independently of the transmission of the medium M and the light intensity $I_0$ of the source S. It is thus not necessary, in this first polarimetric configuration, for the phase adapter AP1 to be configured for modifying the polarisation states of the wave as an output of the plate LP2. The phase adapter AP1 consists of a waveplate LQ1+ (passive achromatic plate λ) which is neutral in terms of phase shift, unlike the configurations illustrated in connection with FIGS. 2 (linear anisotropy) and 3 (elliptical anisotropy) and described below. Thus, the spectrally coded light coming directly from the lineariser modulator ML passes through the medium M. The polarisation states of the light interacting with the medium M are then modified and enter the block MDP1 to be spectrally decoded therein.

Alternatively, the phase adapter AP1 does not comprise any optical plate. This alternative embodiment is highlighted in the figure by the dotted lines for the block AP1. This alternative allows for a smaller and less expensive configuration.

Output Arm of the Device

The block MDP1 comprises a phase compensator CP1 arranged, on the one hand, as an output of the medium M and, on the other hand, as an input of the polariser P2. Generally speaking, the function of the phase compensator is to compensate for the phase delay induced by the phase adapter, in other words to reverse the polarisation transformation induced by the phase adapter. It therefore has to be configured to induce a phase delay of the reverse order to that induced by the phase adapter. In the present example, the phase compensator AP1 consists of an isotropic waveplate LQ1- (passive achromatic plate λ) or, alternatively, the phase compensator is free of an optical plate. The decoding block MDP1 further comprises an achromatic linear polariser P2 defining a polarisation axis orthogonal to the reference axis of the device. This is referred to as a crossed polariser configuration. Without the lineariser modulator ML, this particular configuration would allow a darkfield polarimetric measurement of the circular anisotropy of the medium M to be performed, that is, a quadratic detection of the anisotropy. The crossed polariser configuration combined with the aforementioned lineariser modulator ML significantly increases the sensitivity of polarimetric measurements because it allows linear detection of the anisotropy on the one hand, and the anisotropy and luminous intensity of the light $I_M$ returned by the medium M intervene in the amplitude of two carriers on the other hand. The use of the polarisers P1 and P2 of identical construction and optical properties is to be preferred in order to ensure the highest possible optical extinction in the absence of the medium to be studied and for a zero linearization factor.

It should be noted that the plates LQ1+ and LQ1- are commonly described as "thin", whereas the plates LP1, LP2 are commonly described as "thick". By "thick plate", it is meant a multi-order phase delay plate whose phase shift varies with the wavelength (chromatic), as opposed to a thin plate which is a compensated (or 0-order) plate whose phase delay is independent of the wavelength (achromatic).

Figure 2:
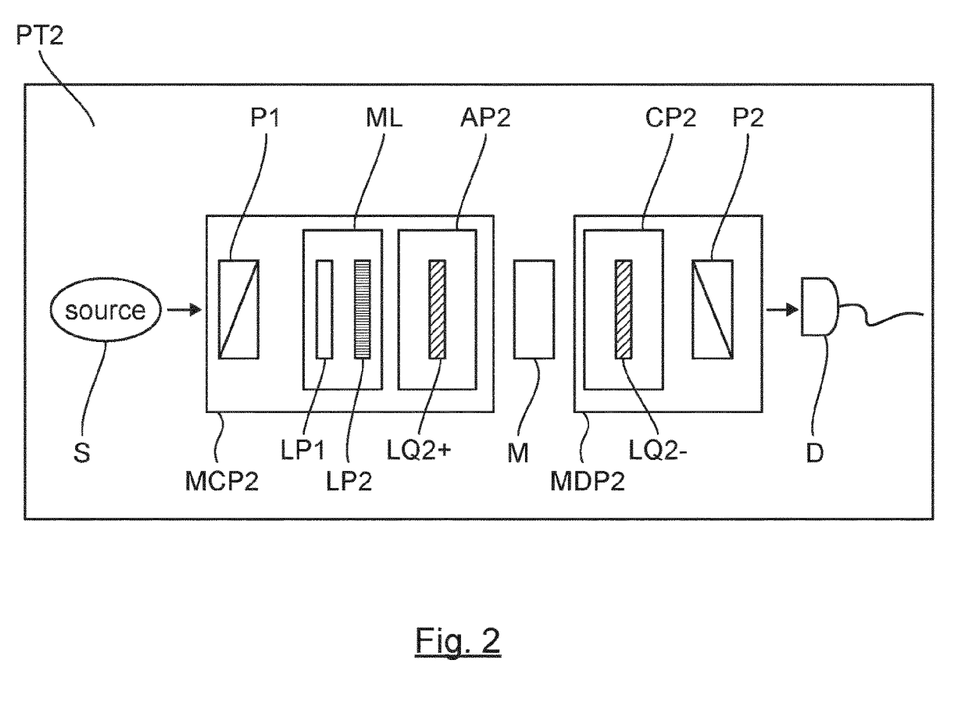
FIG. 2 sets forth a second transmission configuration of a characterisation device according to a particular embodiment of the invention.
Figure 3:
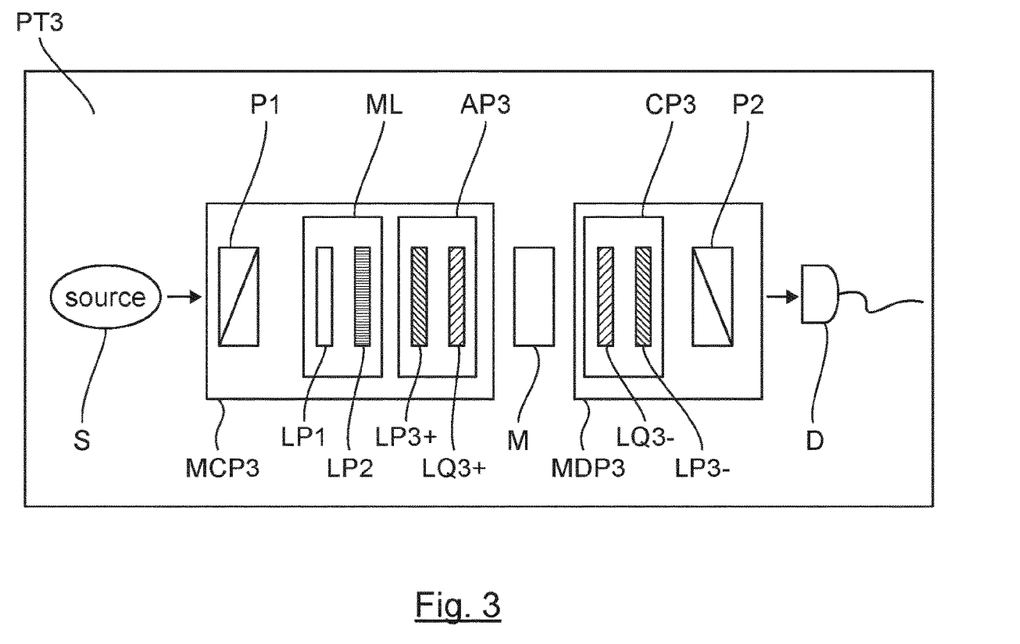
FIG. 3 sets forth a third transmission configuration of a characterisation device according to a particular embodiment of the invention.

FIGS. 2 and 3 illustrate two other transmission configurations of the characterisation device according to the invention.

The device PT2 allows an ultra-sensitive measurement of the linear type anisotropy of a medium M to be performed. It can be a measurement of linear phase anisotropy (for example linear retardance and its azimuth) or amplitude anisotropy (for example linear diattenuation and its azimuth).

The device PT3 allows an ultra-sensitive measurement of the elliptical type anisotropy of a medium M to be performed. It can be a measurement of elliptical phase anisotropy (for example circular retardance, linear retardance and its azimuth), or amplitude anisotropy (for example circular diattenuation, linear retardance and its azimuth).

Unlike the device PT1, the phase adapter AP2 of the device PT2 consists of an achromatic quarter-wave plate LQ2+ and the phase compensator CP2 consists of an achromatic quarter-wave plate LQ2- oriented to induce a phase delay of the reverse order to that of the plate LQ2+. More precisely, the plate LQ2+ is shaped so as to have a neutral axis (fast or slow axis) oriented at an angle equal to 45 degrees with respect to the reference axis. The plate LQ2- is shaped so as to have a neutral axis (fast or slow axis) oriented at an angle equal to -45 degrees with respect to the reference axis. Thus, without the medium M, the combination of the plates LQ2+ and LQ2- behaves as a waveplate which is neutral in terms of phase shift.

The linear anisotropy (FIG. 2) is described by two parameters which are the linear retardance $R_L$ and its azimuth $\theta_R$ (for phase anisotropy) or the linear diattenuation $D_L$ and the azimuth $\theta_D$ (for amplitude anisotropy).

The phase adapter AP2 and the phase compensator CP2 present in the device PT2 enable the linear retardance (or linear diattenuation) to be discriminated from the azimuth. The adapter AP2 and the compensator CP2 are configured to modify the polarisation states of the light before and after the medium M, respectively, so that the amplitude of the carrier at frequency f1 is only dependent on the linear retardance $R_L$ (or linear diattenuation $D_L$) in the form of the mathematical product $I_M \times \alpha \times R_L/2$ (or $I_M \times \alpha \times D_L/2$), and the phase of the carrier is only dependent on the azimuth $\theta_R$ (or $\theta_D$). The amplitude of the first carrier of frequency f0 remains unchanged with respect to the device PT1. It should be noted that the plates LQ2+ and LQ2− are achromatic and therefore do not generate any additional modulation to those induced by the lineariser modulator ML.

Unlike the device PT1, the phase adapter AP3 of the device PT3 consists of a chromatic phase delay plate LP3+ having its neutral axis (fast or slow axis) oriented at an angle equal to 45 degrees with respect to the reference axis and an achromatic quarter-wave plate LQ3+ having its neutral axis (fast or slow axis) oriented at an angle equal to 0 degree with respect to the reference axis. And the phase compensator CP3 consists of an achromatic quarter-wave plate LQ3− having its neutral axis (fast or slow axis) oriented at an angle equal to 90 degrees with respect to the reference axis and a chromatic phase delay plate LP3− having its neutral axis (fast or slow axis) oriented at an angle equal to −45 degrees with respect to the reference axis. The plates LP3− and LQ3− are thus oriented to induce a phase delay of reverse order to that of the plates LP3+ and LQ3+ respectively. For example, the phase delay plates LP1, LP2, LP3+ and LP3− are made of a YVO4-based birefringent crystal.

The elliptical anisotropy (FIG. 3) is described by three parameters which are the circular retardance $\theta$, the linear retardance $R_L$ and its azimuth $\theta_R$ (for phase anisotropy) or the circular diattenuation $D_C$, the linear diattenuation $D_L$ and its azimuth $\theta_D$ (for amplitude anisotropy). Since the adapters AP1 and AP2, and the compensators CP1 and CP2 do not generate more modulations than the lineariser modulator ML, the carrier at frequency f1 is not sufficient to measure the three parameters of the elliptical anisotropy. Indeed, the amplitude or phase of a carrier can be measured, that is, two independent measurements, whereas three independent measurements would be needed to fully qualify the elliptical anisotropy. On the other hand, the use of the chromatic phase plates LP3+ and LP3− adds at least one other carrier of different frequency to those generated by the lineariser modulator ML in order to measure independently the circular retardance $\theta$ (or circular diattenuation $D_C$) by means of the amplitude of the new carrier. On the other hand, the achromatic quarter-wave plates LQ3+ and LQ3− allow the linear delay $R_L$ and its azimuth $\theta_R$ (or the linear diattenuation $D_L$ and its azimuth $\theta_D$) to be separated as a function of the amplitude and phase of another carrier.

The thickness of the plates LP3+ and LP3− has to be chosen as a function of the spectral bandwidth of the source S, the sampling of the detector acquisition card, but also as a function of the thicknesses of the plates LP1 and LP2 present in the lineariser modulator ML. Indeed, it is necessary to ensure that each anisotropy parameter to be characterised is assigned to a different carrier, in order to allow an independent measurement of the three parameters of the elliptical anisotropy.

The addition of the phase adapter AP3 and its compensator CP3 in the device PT3 allows the light signal to be modulated by adding a third carrier of different modulation frequency to the first and second carriers. The resulting photoelectric current delivered by the detector D is the sum of several contributions, namely: a modulation at the frequency f0 whose amplitude is equal to the product $I_M \times \alpha^2$ (for a linearization factor $\alpha$ of less than 10 degrees), a modulation at a second frequency f1 whose amplitude is equal to the product $I_M \times \alpha \times \theta$ (or $I_M \times \alpha \times D_C/4$), and a modulation at a third frequency f2 whose amplitude is only dependent on the linear retardance $R_L$ (or linear diattenuation $D_L$) in the form of the product $I_M \times \alpha \times R_L/2$ (or $I_M \times \alpha \times D_L/4$), and the phase dependent on the azimuth $\theta_R$ (or azimuth $\theta_D$).

The frequency f0 of the first carrier depends on the phase shift of the plate LP1, that is, its thickness and birefringence. The frequency f1 of the second carrier depends on the phase delays of the plates LP1, LP2. The frequency f2 of the third carrier depends on the phase delays of the plates LP1, LP2, LP3+ and LP3−. For example, for four plates LP1, LP2, LP3+ and LP3− made of the same material and of thicknesses respectively equal to e1, e2, e3 (with e3=|e2−e1|/2) and e4 (with e4=|e2−e1|/2), then the first and second frequencies are defined as follows: f1=(1+e2/e1)×f0 and f2=(3+e2/e1)×f0/2.

Typically, the plate LP1 made of YVO4 has a thickness e1 equal to 2.0 mm, the plate LP2 made of YVO4 has a thickness e2 equal to 0.4 mm, and the plates LP3+ and LP3− made of YVO4 have a thickness e3 equal to 0.8 mm. The thickness values chosen for each of these plates are a function of the spectral bandwidth of the source S and the number of time intervals implemented by the detector (for resampling the electrical signal). For a length scan of the laser source over 100 nm in 10 µs, the frequencies f0, f1 and f2 are equal to 1.8 MHz, 2.16 MHz and 2.88 MHz respectively.

Figure 4:
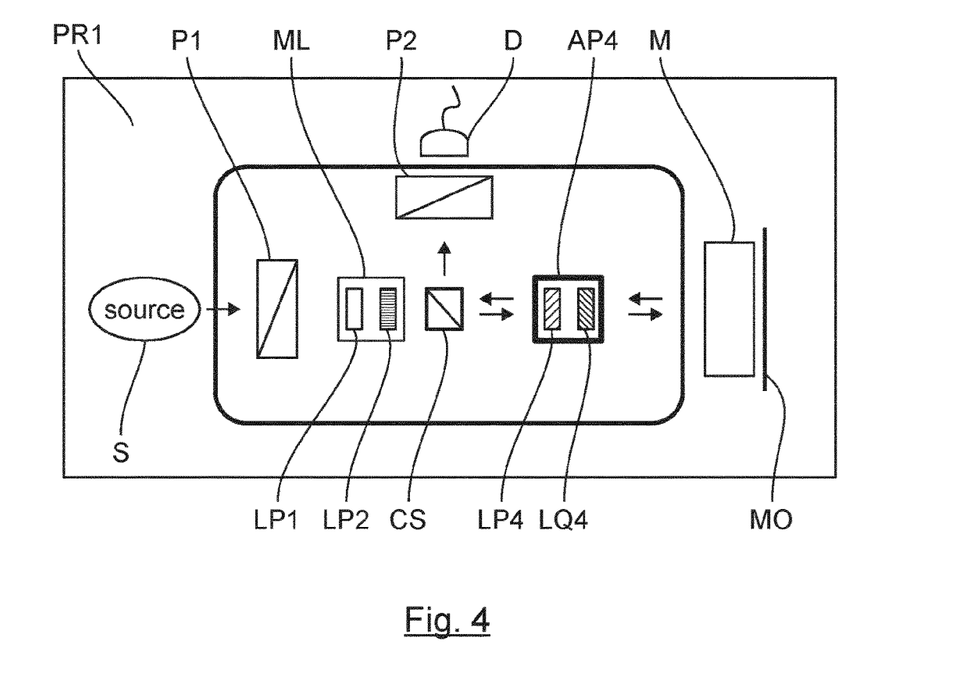
FIG. 4 sets forth a first reflection configuration of a characterisation device according to a particular embodiment of the invention.

FIG. 4 sets forth a first reflection configuration of a characterisation device PR1 according to a particular embodiment of the invention.

As with the device PT3, the characterisation device PR1 is designed to perform an ultra-sensitive measurement of the elliptical type anisotropy of a study medium M. This may be a measurement of elliptical phase or amplitude anisotropy.

In contrast to the transmission configurations described so far, the phase adapter and the phase compensator form one and the same single-block element AP4, hich is arranged, on a same optical axis, between a beam splitter cube CS on the one hand and an optically reflective element MO (typically an optical mirror) on the other hand. The beam splitter cube CS, arranged between the modulator ML and the mono-block element AP4, is arranged to transmit incident light from the modulator ML and to reflect incident light from the mono-block element AP4 towards the detector D. The optical mirror MO is arranged to reflect the light returned by the medium M to the light detector D via the beam splitter cube CS.

The single-block element comprises a set of two plates: the first plate is a phase delay plate LP4 (for example identical to the plate LP3+) and the second plate is an achromatic quarter-wave plate (for example identical to the plate LQ3+). The single-block element plays a different role depending on the direction of incidence of the light beam impinging on it: the role of a phase adapter when the incident light corresponds to the light coming from the beam splitter CS and the role of a phase compensator when the incident light corresponds to the light reflected from the optical mirror MO. The operating principle of the adapter and the phase compensator is identical to that described above (in connection with FIG. 3).

Figure 5:
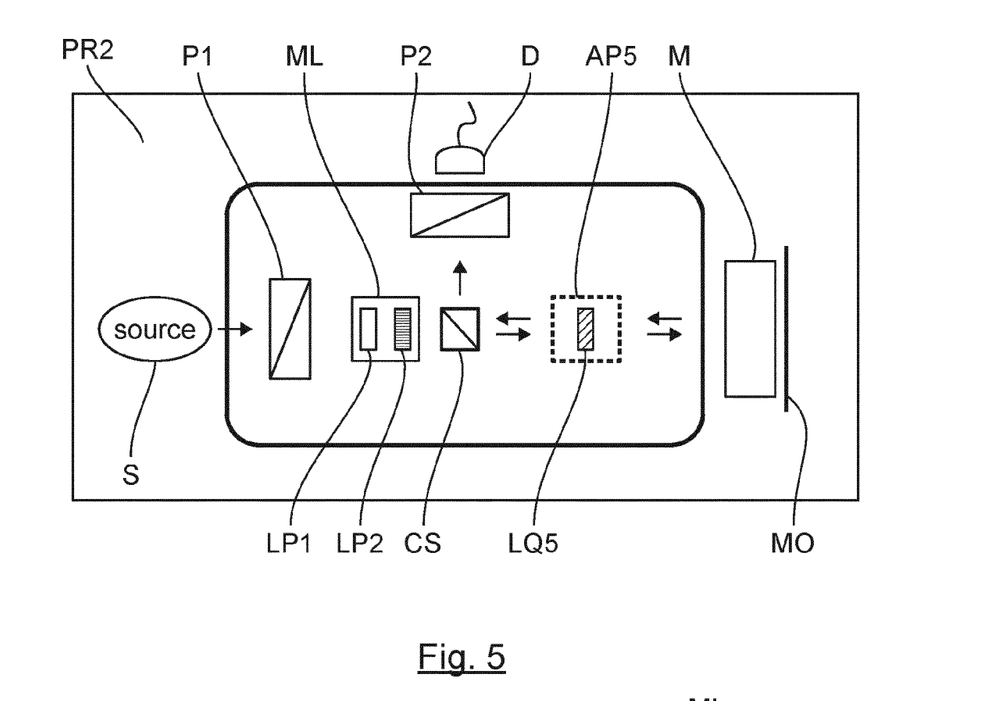
FIG. 5 sets forth a second reflection configuration of a characterisation device according to a particular embodiment of the invention.

FIG. 5 sets forth a second reflection configuration of a characterisation device PR2 according to a particular embodiment of the invention.

As with the device PT1, the characterisation device PR2 is designed to perform an ultra-sensitive measurement of the circular type anisotropy of a study medium M. This may be a measurement of circular phase or amplitude anisotropy.

In contrast to the configuration of the device PR1, the single-block element AP5 performing the roles of adapter and phase compensator according to the invention consists of a single achromatic wave plate LQ5 (for example identical to the plate LQ1+). Alternatively, the single-block element AP5 does not consist of any plate (the medium M is then comprised directly between the optical mirror MO and the splitter cube CS), thus making the device more compact.

According to another particular embodiment of the invention, an imaging system comprising a polarimetric characterisation device, such as that described above in one of its embodiments (in connection with FIGS. 1 to 5), and means for generating a polarimetric image of the medium, are provided.

Polarimetric characterisation measurement data of the medium M are obtained by the processing unit of the device, as a function of the electrical signals delivered by the detector D. The processing unit is moreover electrically connected to the generating means so as to be able to process the polarimetric characterisation measurement data obtained by the device and convert them into an image representative of the measured anisotropy. Such an image makes it possible to deliver relevant visual information illustrating the anisotropic characteristics of the medium M, to the user of the system.

The imaging system according to the invention may be configured to allow wide field imaging or laser scan imaging. For a configuration based on a spectrometer, for example, the system will incorporate a spectral broadband light source and, on the detector side, a spectrometer (laser scan imaging) or a hyper-spectral camera (wide field imaging). It should be noted that the electrical intensity delivered by the detector is in this case defined in optical frequency intervals. For a configuration based on a wavelength scan laser source, the system will integrate, on the source side, a wavelength tunable laser source sequentially delivering different wavelengths over a spectral broadband and, on the detector side, a photodetector (laser scan imaging) or a CCD ("Charge Coupled Device") camera (wide field imaging). The electrical intensity delivered by the detector is in this case defined in time intervals equivalent to optical frequency intervals.

The mathematical relationships for the calculation of the tilt angle α and the measurement of anisotropy of the medium, for a wavelength scan laser source on the one hand, and for a spectral broadband laser source on the other hand, are set forth below.

Calculation of the Tilt Angle α of the Phase Plate LP1 in the Linear Modulator ML For a Wavelength Scan Source The detector is for example a PIN or APD type photodiode. The tilt angle α is then defined by the following equation:

$$\alpha = \frac{1}{2}\sqrt{\frac{P_{sat}}{P_0}}$$

with:
$P_{sat}$ the saturation optical power of the photodiode;
$P_0$ is the optical power at the anisotropic medium.
For example, for optical power values $P_{sat}$=5 µW and $P_0$=20 mW, the tilt angle α that the phase plate LP1 has to take is equal to $7.9 \times 10^{-3}$ rad, that is, α=0.42 degrees.

For a Broadband Source

The detector is for example a spectrometer with a CCD imaging camera. The tilt angle α is then defined by the following equation $$\alpha = \frac{1}{2}\sqrt{\frac{P_{sat}}{P_0/N_s}}$$

with:
$P_{sat}$ the saturation optical power of a pixel of the CCD camera;
$P_0$ the optical power at the anisotropic medium;
$N_s$ is the number of pixels in the CCD camera.
For example, for optical power values $P_{sat}$=0.5 nW, $P_0$=20 mW and a number of pixels $N_s$=2048, the tilt angle α that the phase plate LP1 has to take is equal to $3.5 \times 10^{-3}$ rad, that is, α=0.20 degrees.

Calculation of Anisotropy of the Medium

The resolution of the anisotropy measurement is the smallest anisotropy value that can be measured by the detector. It is mainly conditioned by the disturbance noise at the detector. The measurement of anisotropy of the medium is hereafter referred to as "m":

For a medium with circular phase anisotropy, m=θ with θ the optical rotation angle.

For a medium with circular amplitude anisotropy, m=$D_C$/4 with: $D_C$=($\mu_{RCP}$−$\mu_{LCP}$)×L, where L is the thickness of the medium, $\mu_{RCP}$ and $\mu_{LCP}$ are the absorption or scattering intensity coefficients of the right and left circular polarisation states respectively.

For a medium with linear phase anisotropy, m=$R_L$/2 with: $R_L$=2×π×($n_{slow}$−$n_{fast}$)×L×$v_0$/c where L is the thickness of the medium, $n_{slow}$ and $n_{fast}$ are the refractive indices of the neutral axes, $v_0$ is the optical frequency and c is the speed of light.

For a medium with linear amplitude anisotropy, m=$D_L$/4 with: $D_L$=($\mu_2$−$\mu_1$)×L, where $\mu_1$ and $\mu_2$ are the absorption or scattering intensity coefficients of two rectilinear and orthogonal polarisation states.

For a Wavelength Scan Source

The detector is for example a PIN or APD type photodiode. The resolution deviation of the anisotropy measurement is then defined by the following equation $$\Delta m = \sqrt{\frac{T\left(NEP^2 + 2\frac{hv_0}{\eta}\sqrt{6}P_0\alpha^2\right)B}{2N_s P_0^2 \alpha^2}}$$

with:
1/T the measurement frequency of the detector;

α the tilt angle of the phase plate LP1 in the linear modulator ML;

NEP the noise equivalent power associated with the detector;

h the Planck's constant;

$v_0$ the optical frequency;

η the quantum efficiency of the detector;

B the bandwidth of the detector; and $N_s$ is the number of values associated with the sampling of the electrical signal delivered by the detector used to convert light power into electrical current.

For example, for a measurement at frequency 1/T=100 kHz, optical power $P_0$=20 mW, tilt angle α=0.42 degrees, noise equivalent power of NEP=0.5 pW/Hz$^{1/2}$, optical frequency $v_0=3\times10^{14}$ Hz (corresponding to a wavelength of 1 μm), quantum efficiency η=40%, bandwidth B=150 MHz (associated with the time sampling of the electrical signal), number $N_s$=1440 and constant h=6.63 $10^{-34}$ J·s, the resolution deviation of the anisotropy measurement Δm is equal to $8.3\times10^{-9}$ Hz$^{-1/2}$.

From this value Δm, the following anisotropy values are obtained:

$\Delta\theta = 5\times10^{-7}$ deg·Hz$^{-1/2}$;

$\Delta R_L = 1\times10^{-6}$ deg.·Hz$^{-1/2}$;

$\Delta D_L = 35\times10^{-9}$ Hz$^{-1/2}$;

$\Delta D_C = 35\times10^{-9}$ Hz$^{-1/2}$.

For a Broadband Source

The detector is for example a spectrometer with a CCD imaging camera. The resolution deviation of the anisotropy measurement is then defined by the following equation $$\Delta m = \sqrt{\frac{T\left(NEP^2 + 2\frac{hv_0}{\eta}\sqrt{6}P_0\alpha^2\right)B}{2N_s P_0^2 \alpha^2}}$$

with:

1/T the measurement frequency of the detector;

α the tilt angle of the phase plate LP1 in the linear modulator ML;

NEP the noise equivalent power associated with the detector;

h the Planck's constant;

$v_0$ the optical frequency;

η the quantum efficiency of the detector;

B the bandwidth of the detector; and $N_s$ the number of pixels in the CCD camera.

For example, for a measurement at frequency 1/T=100 kHz, optical power $P_0$=20 mW, tilt angle α=0.20 degrees, noise equivalent power of NEP=1×10$^{-3}$ pW/Hz$^{1/2}$, optical frequency $v_0=3\times10^{14}$ Hz (corresponding to a wavelength of 1 μm), quantum efficiency η=40%, bandwidth B=150 MHz (associated with the integration time of a pixel), number of pixels $N_s$=2048 and constant h=6.63 $10^{-34}$ J·s, the resolution deviation of the anisotropy measurement Δm is equal to $7.8\times10^{-9}$ Hz$^{-1/2}$.

From this value Δm, the following anisotropy values are obtained:

$\Delta\theta = 4.5\times10^{-7}$ deg·Hz$^{-1/2}$;

$\Delta R_L = 0.90\times10^{-6}$ deg·Hz$^{-1/2}$;

$\Delta D_L = 31\times10^{-9}$ Hz$^{-1/2}$;

$\Delta D_C = 31\times10^{-9}$ Hz$^{-1/2}$.

This is of course a purely illustrative and non-limiting example of the invention.

It should be noted that the integration of a calculation unit (or module), connected on the one hand to the light and on the other hand to the detector, and configured to determine a value of the tilt angle α of the phase plate as a function especially of the parameters of the detector (such as the saturation threshold or the saturation optical power) so as to obtain an increased sensitivity of said device to the anisotropy measurement, could be contemplated.

The invention claimed is:

1. A device for polarimetrically characterising the anisotropy of a medium, comprising:

a light source capable of emitting multi-wavelength light;

a spectral polarisation coding block arranged between the light source and the medium, configured to spectrally polarisation code the emitted light, said coding block comprising a first polariser defining a first polarisation axis, called a reference axis, and a spectral modulator arranged as an output of the first polariser, said spectral modulator comprising first and second chromatic phase delay plates arranged successively and shaped so as to produce first and second distinct phase delays respectively;

a light detector defining a predetermined intensity saturation threshold; and a spectral polarisation decoding block arranged between the medium and the light detector and configured to spectrally polarisation decode light returned by the medium, said decoding block comprising a second polariser defining a second polarisation axis oriented perpendicular to the reference axis, wherein the first phase delay plate has a first neutral axis defining, with the reference axis, a tilt angle whose value is in a range of 0 degrees to 90 degrees and is a function of a saturation threshold of the light detector and intensity level of the multi-wavelength light emitted by the light source to obtain an increased sensitivity of said device.

2. The device according to claim 1, wherein said first and second phase delay plates comprise a same birefringent crystalline material and have a different thickness.

3. The device according to claim 1, wherein said first and second phase delay plates comprise a crystalline material of different birefringence.

4. The device according to claim 1, wherein the second phase delay plate has a second neutral axis oriented so as to be the same as the reference axis.

5. The device according to claim 1, wherein the light source has a predetermined spectral bandwidth, the first and second phase delay plates each have a thickness which depends on said predetermined spectral bandwidth.

6. The device according to claim 1, wherein:

the coding block comprises a passive phase adapter arranged as an output of the spectral modulator and shaped so as to induce a third phase delay; and the decoding block comprises a passive phase compensator arranged as an input of the second polariser and shaped so as to apply a fourth phase delay which is a reverse phase delay to the third phase delay.

7. The device according to claim 6, wherein:

the phase adaptor consists only of a first achromatic waveplate or is free of an optical plate;

the phase compensator consists only of a second achromatic waveplate or is free of an optical plate.

8. The device according to claim 6, wherein:
the phase adapter consists only of a first achromatic quarter-wave plate, having a neutral axis oriented at an angle substantially equal to 45 degrees with respect to the reference axis;
the phase compensator consists only of a second achromatic quarter-wave plate, having a neutral axis oriented at an angle substantially equal to −45 degrees with respect to the reference axis.

9. The device according to claim 6, wherein:
the phase adapter consists only of:
 a third chromatic phase delay plate having a third neutral axis oriented at an angle substantially equal to 45 degrees with respect to the reference axis,
 a first achromatic quarter-wave plate, having a first neutral axis oriented at an angle substantially equal to 0 degrees with respect to the reference axis, and arranged as an output of said third plate;
the phase compensator consists only of:
 a second achromatic quarter-wave plate, having a second neutral axis oriented at an angle substantially equal to 90 degrees with respect to the reference axis; and
 a fourth chromatic phase delay plate having a fourth neutral axis oriented at an angle substantially equal to −45 degrees with respect to the reference axis, and arranged as an output of said second plate.

10. The device according to claim 6, wherein the phase adapter and the phase compensator form two distinct blocks arranged on either side of the medium so as to form a transmission polarimetric configuration.

11. The device according to claim 6, wherein the phase adapter and the phase compensator form a single-block element arranged between a beam splitter cube and an optically reflective element, said reflective element being arranged to reflect light returned by the medium to the light detector via the beam splitter cube so as to form a reflection polarimetric configuration, said single-block element playing a role of a phase adapter for incident light coming from the beam splitter and of a compensator for incident light corresponding to light reflected by the reflective element.

12. An imaging system comprising:
a polarimetric characterisation device for obtaining polarimetric characterisation measurement data, including anisotropy of a medium, the polarimetric characterisation device comprising:
a light source capable of emitting multi-wavelength light;
a spectral polarisation coding block arranged between the light source and the medium, configured to spectrally polarisation code the emitted light, said coding block comprising a first polariser defining a first polarisation axis, called a reference axis, and a spectral modulator arranged as an output of the first polariser, said spectral modulator comprising first and second chromatic phase delay plates arranged successively and shaped so as to produce first and second distinct phase delays respectively;
a light detector defining a predetermined intensity saturation threshold; and
a spectral polarisation decoding block arranged between the medium and the light detector and configured to spectrally polarisation decode light returned by the medium, said decoding block comprising a second polariser defining a second polarisation axis oriented perpendicular to the reference axis,
wherein the first phase delay plate has a first neutral axis defining, with the reference axis, a tilt angle whose value is in a range of 0 degrees to 90 degrees and is a function of a saturation threshold of the light detector and intensity level of the multi-wavelength light emitted by the light source to obtain an increased sensitivity of said device; and
a polarimetric image generator, which is configured to generate a polarimetric image of the medium taking account of said polarimetric characterisation measurement data.

* * * * *